United States Patent
Sakaguchi et al.

(10) Patent No.: US 12,196,255 B2
(45) Date of Patent: Jan. 14, 2025

(54) HUB BEARING

(71) Applicant: NTN CORPORATION, Osaka (JP)

(72) Inventors: Tomoya Sakaguchi, Shizuoka (JP); Naoto Shibuya, Shizuoka (JP); Makoto Seki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 76 days.

(21) Appl. No.: 17/774,456

(22) PCT Filed: Nov. 2, 2020

(86) PCT No.: PCT/JP2020/041056
§ 371 (c)(1),
(2) Date: May 4, 2022

(87) PCT Pub. No.: WO2021/090805
PCT Pub. Date: May 14, 2021

(65) Prior Publication Data
US 2022/0403874 A1    Dec. 22, 2022

(30) Foreign Application Priority Data
Nov. 5, 2019   (JP) .................... 2019-200962

(51) Int. Cl.
F16C 19/18     (2006.01)
F16C 33/58     (2006.01)
F16C 33/66     (2006.01)

(52) U.S. Cl.
CPC ............. F16C 19/18 (2013.01); F16C 33/58 (2013.01); F16C 33/6633 (2013.01);
(Continued)

(58) Field of Classification Search
CPC ...... F16C 19/18; F16C 33/58; F16C 2210/04; F16C 2240/54; F16C 2326/02; B60B 27/0005
See application file for complete search history.

(56) References Cited

U.S. PATENT DOCUMENTS 7,234,872 B2 *  6/2007  Fujita .................. F16C 33/6648
7,891,879 B2 *  2/2011  Hirai ...................... F16C 43/04
                                                          29/898.066
(Continued)

FOREIGN PATENT DOCUMENTS

CN    1643265 A     7/2005
EP    1489318 A1   12/2004
(Continued)

OTHER PUBLICATIONS

Translation of JP2002242942 obtained Nov. 22, 2023.*
(Continued)

*Primary Examiner* — James Pilkington
(74) *Attorney, Agent, or Firm* — Hedman & Costigan, P.C.; James V. Costigan; Kathleen A. Costigan

(57) ABSTRACT

A hub bearing 1 including an outer ring 2 that serves as a stationary side raceway ring, a hub wheel 3 and an inner ring 5 serving as a rotatable side raceway ring, balls 4 serving as a plurality of rolling elements disposed between a raceway surface of the stationary side raceway ring and a raceway surface of the rotatable side raceway ring, and grease that lubricates a rolling contact part between each of the raceway surfaces and the rolling elements. The surface roughness of at least one raceway surface selected from the raceway surface of the stationary side raceway ring and the raceway surface of the rotatable side raceway ring in the rolling contact part is 0.03 μm Ra or less.

3 Claims, 10 Drawing Sheets

(52) U.S. Cl.
CPC ...... *F16C 2210/04* (2013.01); *F16C 2240/54* (2013.01); *F16C 2326/02* (2013.01)

(56) References Cited

U.S. PATENT DOCUMENTS

| | | | | |
|---|---|---|---|---|
| 10,087,985 | B2* | 10/2018 | Inoue | ............ C10M 169/00 |
| 2005/0092396 | A1 | 5/2005 | Takemura et al. | |
| 2007/0092174 | A1 | 4/2007 | Ueda et al. | |
| 2018/0298304 | A1* | 10/2018 | Yoshizaki | ........... F16C 33/6633 |

FOREIGN PATENT DOCUMENTS

| | | | |
|---|---|---|---|
| EP | 1754903 | A1 | 2/2007 |
| JP | H11303861 | A | 11/1999 |
| JP | 2002070873 | A | 3/2002 |
| JP | 2002242942 | * | 8/2002 |
| JP | 2004011712 | A | 1/2004 |
| JP | 2004301149 | A | 10/2004 |
| JP | 2005308207 | A | 11/2005 |
| JP | 2013203318 | A | 10/2013 |
| JP | 2017044342 | A | 3/2017 |
| KR | 1020060032203 | A | 4/2006 |
| WO | 2003081062 | A1 | 10/2003 |
| WO | 2005047718 | A1 | 5/2005 |
| WO | 2006043566 | A1 | 4/2006 |
| WO | 2019116971 | A1 | 6/2019 |
| WO | 2019163557 | A1 | 8/2019 |

OTHER PUBLICATIONS

Hirano, Atsushi; Influence of Wheel Stiffness on Vehicle Dynamic Performance, Transactions of the Society of Automotive Engineers of Japan, vol. 46, No. 2, Mar. 2015, p. 393-398.
Machine Translation of JPH11303861A dated Nov. 2, 1999.
Machine Translation of JP2013203318A dated Oct. 7, 2013.
Machine Translation of JP2017044342 dated Mar. 2, 2017.
Machine Translation of JP2005308207 dated Nov. 4, 2005.
Machine Translation of JP2004301149 dated Oct. 28, 2004.
Machine Translation of JP2004011712A dated Jan. 15, 2004.
Machine Translation of JP2002070873 dated Mar. 8, 2002.
Machine Translation of KR1020060032203 dated Apr. 14, 2006.
Machine Translation of abstract of CN1643265A dated Jul. 20, 2005 not available; machine translation of abstract of corresponding document for EP1489318A1 attached.

* cited by examiner a) inner ring is rotating at constant inclined angle b) directly after inclined angle is increased c) shortly after inclined angle has been increased change of inclined angle of inner ring

HUB BEARING

BACKGROUND OF THE INVENTION

The present invention relates to a hub bearing that rotatably supports a wheel of a vehicle.

A steering stability of a vehicle (also simply referred to as a vehicle steering stability) is still an important property even when an automatic driving technology of a vehicle will have been developed so that a computer controls the steering of the vehicle. The reason thereof is that, even in a case in which a high-performance computer is employed, when the reaction of the vehicle to a steering signal is too slow, a delay in the response of the vehicle against the steering is caused in the turning of the vehicle after the steering and thus it is difficult to travel the vehicle on an expected track. A factor that affects the vehicle steering stability is bending rigidity of a hub bearing that supports a wheel (see Non-Patent Document 1). The hub bearing is an axle bearing that rotatably supports a wheel of a vehicle, and the hub bearing is integrated, as a unit, with a hub wheel or a housing which is a peripheral component of the bearing, so that the number of components and the weight of the hub bearing are reduced.

Non-Patent Document 1 discloses that the rigidity of a disc part of a wheel largely affects the responsiveness of the vehicle and thus it is effective to enhance the rigidity. Also, Non-Patent Document 1 discloses that the compliance (a reciprocal of the rigidity, unit of degree/Nm) of the hub bearing is 18% of the suspension camber compliance of the whole underbody parts, and the compliance of the hub bearing is twice as large as that of the wheel. Thus, it is found that an influence of the rigidity of the hub bearing that affects the vehicle steering stability cannot be ignored.

As a technique for improving the vehicle steering stability by the hub bearing, for example, Patent Document 1 has been known. Patent Document 1 discloses a hub bearing that improves a shape of a hub flange so as to enhance rigidity compared to that of a hub bearing having the same weight. With such improvement, the compliance based on the hub bearing can be reduced, and thus the responsiveness of the vehicle can be enhanced.

As a technique for improving the vehicle steering stability by a suspension, for example, Patent Document 2 has been known. Patent Document 2 discloses that, in order to improve the responsiveness of a behavior of a vehicle, in particular the responsiveness at an early stage of turning, a suspension having a mechanism that temporarily enhances the rigidity of a mount of a hub bearing when the beginning of turning of the vehicle is detected.

As disclosed in these Patent Documents, in improving the responsiveness of the vehicle, it is considered that the hub bearing has a part of the rigidity of the whole of the suspension, and thus a hub bearing that is lighter weight and higher rigidity has been developing. In addition, a suspension that has a special variable mechanism for improving the responsiveness at an early stage of turning has been also developing.

Patent Document 1: JP H11-303861 A
Patent Document 2: JP 2013-203318 A
Non-Patent Document 1: Hirano, Transactions of the Society of Automotive Engineers of Japan, vol. 46, no. 2, March 2015, p. 393-398

In the technical development so far for improving the vehicle steering stability, the hub bearing is deemed as rigidity, namely a spring element, and thus the try to enhance rigidity has been carried out. However, there is a limit to enhance the rigidity. Thus, in order to further improve the vehicle steering stability, a special variable mechanism has been added to the suspension or the like.

However, the present inventors conducted a dynamic analysis of the rigidity of the hub bearing and found that the hub bearing has not only a function of a static spring element but also a delay in a response (hysteresis) in a change of a camber angle relative to a moment.

An object of the present invention is, in order to solve such problems, to provide a hub bearing that is capable of reducing a delay in a response of the hub bearing to improve a steering stability of a vehicle.

BRIEF SUMMARY OF THE INVENTION

A hub bearing for vehicles of the present invention includes a stationary side raceway ring, a rotatable side raceway ring, a plurality of rolling elements disposed between a raceway surface of the stationary side raceway ring and a raceway surface of the rotatable side raceway ring, and grease that lubricates a rolling contact part between each of the raceway surfaces and the rolling elements. The surface roughness of at least one raceway surface selected from the raceway surface of the stationary side raceway ring and the raceway surface of the rotatable side raceway ring in the rolling contact part is 0.03 μmRa or less.

In particular, the surface roughness of the raceway surface of the stationary side raceway ring may be 0.030 μmRa or less.

The grease may be configured such that a traction coefficient in the rolling contact part is 0.04 or less at 40° C. when a vehicle speed is 20 km/h or more. Further, the dynamic viscosity at 40° C. of a base oil of the grease may be less than 30 mm$^2$/s.

The surface roughness of the selected raceway surface may be 0.014-0.030 μmRa.

The hub bearing of the present invention includes the stationary side raceway ring, the rotatable side raceway ring, a plurality of the rolling elements disposed between the raceway surface of the stationary side raceway ring and the raceway surface of the rotatable side raceway ring, and the grease that lubricates the rolling contact part between each of the raceway surfaces and the rolling elements. Further, the surface roughness of at least one raceway surface selected from the raceway surface of the stationary side raceway ring and the raceway surface of the rotatable side raceway ring in the rolling contact part is 0.03 μmRa or less. Accordingly, the delay in the response of the hub bearing can be reduced, and thus the steering stability of the vehicle can be improved. This is because the traction coefficient in the rolling contact part in the hub bearing can be reduced.

Further, the surface roughness of the raceway surface of the stationary side raceway ring is 0.030 μmRa or less. Accordingly, the effect of reducing the traction coefficient can be easily realized.

The grease is configured such that the traction coefficient in the rolling contact part is 0.04 or less at 40° C. when the vehicle speed is 20 km/h or more. Accordingly, superior steering stability can be realized in a range that requires a high responsiveness of the vehicle.

The dynamic viscosity at 40° C. of the base oil of the grease is less than 30 mm$^2$/s. Accordingly, a low torque property of the hub bearing can be realized and the traction coefficient can be reduced.

The surface roughness of the selected raceway surface is 0.014-0.030 µmRa. Accordingly, the steering stability can be sufficiently realized and machining cost can be reduced.

DETAILED DESCRIPTION OF THE INVENTION

Figure 1:
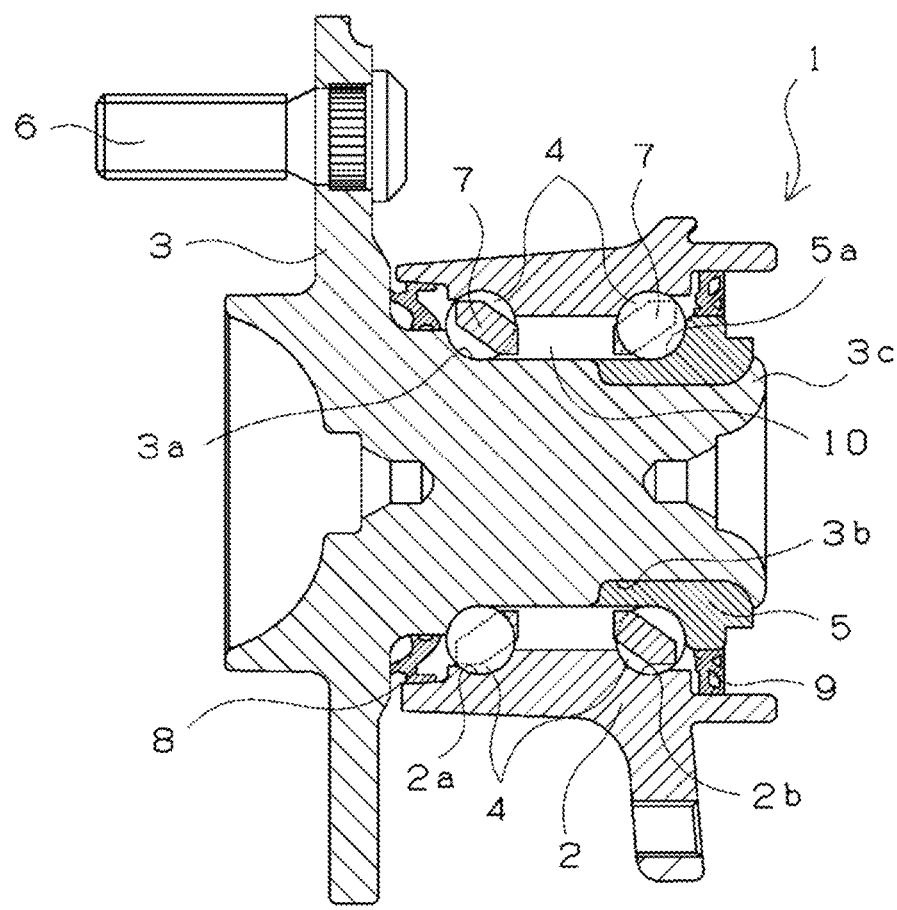
FIG. 1 is a sectional view showing an example of a hub bearing of the present invention.

A hub bearing of the present invention is described with reference to FIG. 1. FIG. 1 is a sectional view of a hub bearing for vehicles according to one example of the hub bearing of the present invention. The hub bearing includes an outer ring serving as a stationary side raceway ring, and a hub wheel and an inner ring serving as a rotatable side raceway ring.

As shown in FIG. 1, a hub bearing 1 rotatably supports a hub bearing 3 and an inner ring 5 as a rotatable side raceway ring, at an inner diametrical side of an outer ring 2 as a stationary side raceway ring, via a plurality of balls 4 as rolling elements. The inner ring 5 is fixed to the hub wheel 3. With this configuration, double-row outer ring raceway surfaces 2a, 2b that are stationary side raceway surfaces are disposed on an inner peripheral surface of the outer ring 2, and first and second inner raceway surfaces 3a, 5a that are rotatable side raceway surfaces are disposed on an outer peripheral surface of the hub wheel 3 and an outer peripheral surface of the inner ring 5, respectively. A hub bolt 6 that supports a wheel is disposed in an outer end portion of the outer peripheral surface of the hub wheel 3. The first inner ring raceway surface 3a is disposed on an intermediate portion of the outer peripheral surface of the hub wheel 3. A small diametrical stepped portion 3b having a diameter smaller than that of a portion on which the first inner ring raceway surface 3a is disposed, is disposed on a portion close to an inner end relative to the intermediate portion of the outer peripheral surface of the hub wheel 3. The inner ring 5 having the second inner ring raceway surface 5a with a sectional arc shape on an outer peripheral surface is fitted onto the small diametrical stepped portion 3b. An inner end surface of the inner ring 5 is pressed by a swaging portion 3c formed by plastically deforming an inner end portion of the hub wheel 3 toward a radially outer side, so that the inner ring 5 is fixed to the hub wheel 3.

A plurality of the balls 4 is disposed between each of the outer ring raceway surfaces 2a, 2b and each of the inner ring raceway surfaces 3a, 5a, to be rollably retained by cages 7. By assembling these components in such a manner, a back side assembled double-row angular type ball bearing is formed. In FIG. 1, a right side corresponds to an inboard side, and a left side corresponds to an outboard side. Seals 8, 9 are disposed between each of the inner peripheral surfaces of both end portions of the outer ring 2 and each of the outer peripheral surface of the intermediate portion of the hub wheel 3 and the outer peripheral surface of the inner end portion of the inner ring 5. Thus, an inner space 10 in which the balls 4 are disposed, and an outer space are isolated to each other, by a portion between the inner peripheral surface of the outer ring 2 and the outer peripheral surface of the hub wheel 3. Grease (not shown) is disposed and sealed in the inner space 10 so as to lubricate a rolling contact part between each of the outer ring raceway surfaces 2a, 2b and the inner ring raceway surfaces 3a, 5a, and rolling surfaces of the balls 4.

The components such as the stationary side raceway ring, the rotatable side raceway ring, the rolling element and the cage, used in the hub bearing of the present invention are formed of well-known bearing metal material. Specifically, examples of the bearing material include bearing steel (high carbon chromium bearing steel JIS G 4805), case hardening steel (JIS G 4104 or the like), high-speed steel (AMS 6490), stainless steel (JIS G 4303), induction hardening steel (JIS G 4051 or the like), and carbon steel for mechanical structure (S53C or the like). Examples of the material of the cage include cold-rolled steel sheet for pressed cage (JIS G 3141 or the like), carbon steel for machined cage (JIS G 4051), and high strength brass casting for machined cage (JIS H 5102 or the like). However, other bearing alloy may be employed. Of these materials, the carbon steel for mechanical structure such as S53C that is superior in forging property and low in cost is preferably employed as the material of the outer ring serving as a stationary side raceway ring, and the hub wheel serving as a rotatable side raceway ring. The carbon steel is generally used after rolling fatigue strength of a bearing part is secured by applying an induction heat treatment thereto.

In the rolling contact part of the hub bearing of the present invention, at least one raceway surface selected from the raceway surface of the stationary side raceway ring and the raceway surface of the rotatable side raceway ring has a surface roughness of 0.030 µm or less (0.030 µmRa or less) in an arithmetical mean. The lower limit of the surface roughness is not especially limited, however the surface roughness is preferably 0.010 µmRa or more, more preferably 0.014 µmRa or more from a viewpoint of its machining cost. The grounds for the range of the surface roughness of the raceway surface are described in detail below based on an examined result. Generally, the surface roughness of the raceway surface of the raceway ring in the hub bearing is, for example, approximately 0.050 µm, however the surface roughness of the present invention is set in a range lower than the generally-used surface roughness of 0.050 µm. The arithmetical mean roughness Ra in the present invention is defined by the standard of JIS B 0601 and is measured using a contact or non-contact type surface roughness tester.

Examples of a method for reducing the value of the surface roughness include lapping finishing, tumbler finishing, and aero-lapping finishing.

The grease used in the present invention contains a base oil and a thickener, and further various additives are added as needed thereto. Examples of the base oil of the grease include highly refined oil, mineral oil, ester oil, ether oil, synthetic hydrocarbon oil (PAO oil), silicone oil, fluorine oil, and mixed oil of any of these oils.

Examples of the mineral oil include paraffinic mineral oil and naphthenic mineral oil. The paraffinic mineral oil is preferably employed because of less change of viscosity at high temperature. The PAO oil is α-olefin or isomerized α-olefin oligomer or polymer compound. Examples of the α-olefin includes 1-Octene, 1-Nonene, 1-Decene, 1-Dodecene, 1-Tridecene, 1-Tetradecene, 1-Pentadecene, 1-Hexadecene, 1-Heptadecene, 1-Octadecene, 1-Nonadecene, 1-Eicosene, 1-Docosene, and 1-Tetradocosene. Normally, a mixture of any these α-olefins is employed.

Of these base oils, the base oil that contains the synthetic hydrocarbon oil as a main component is preferable because the thickness of the oil film is hardly reduced even at low viscosity. In this case, the content of the synthetic hydrocarbon oil to the whole of the base oil (mixed oil) is preferably 50 mass % or more. Considering the balance between the performance and the cost, the mixed oil of the mineral oil and the synthetic hydrocarbon oil is preferable. By employing the base oil formed as a mixed oil of the mineral oil and the synthetic hydrocarbon oil and setting the content of the synthetic hydrocarbon oil to the whole of the base oil (mixed oil) to 50 mass % or more, a low traction coefficient can be obtained similar to a base oil in which the content of the synthetic hydrocarbon oil is 100 mass %. Each of the mineral oil and the synthetic hydrocarbon oil may be mixed oil of two or more kinds of oils (mixed mineral oil or mixed synthetic oil).

Dynamic viscosity of the base oil (in a case of mixed oil, the dynamic viscosity of the mixed oil) at 40° C. is preferably, for example, less than 30 mm$^2$/s. The lower limit of the dynamic viscosity is, for example, 5 mm$^2$/s or more, preferably 5-25 mm$^2$/s, more preferably 5-20 mm$^2$/s. In the present invention, the surface roughness of the raceway ring is set to be lower than the normal one, so that low dynamic viscosity of the base oil can be realized in a state in which an increase of traction due to interference between protrusions is hardly caused, and thus a low torque property of the hub bearing can be realized and the traction coefficient can be reduced.

The thickener of the grease is not especially limited, and therefore a general thickener normally used in a field of grease may be employed. For example, soap-based thickener such as metal soap and complex metal soap, or non-soap-based thickener such as bentone, silica gel, urea compound, and urea-urethane compound may be employed. Examples of the metal soap include sodium soap, calcium soap, aluminum soap, and lithium soap. Examples of the urea compound and the urea-urethane compound include diurea compound, triurea compound, tetraurea compound, other polyurea compounds, and diurethane compound.

A compound rate of the thickener to the whole of the grease is, for example, 5-40 mass %, preferably 10-30 mass %, and more preferably 10-20 mass %. In a case in which the content of the thickener is less than 5 mass %, a thickening effect is inferior and thus the grease is difficult to be in a greasy condition. Further, in a case in which the content of the thickener is more than 40 mass %, the obtained base grease becomes too hard.

In addition, a known additive may be added as needed to the grease. Examples of the additive include an extreme pressure agent such as organic zinc compound and organic molybdenum compound, an antioxidant such as amine-based compound, phenol-based compound and sulfur-based compound, a friction preventive agent such as sulfur-based compound and phosphorus-based compound, an antirust agent such as polyhydric alcohol ester, a friction reduction agent such as molybdenum disulfide and graphite, and an oily agent such as ester and alcohol.

The worked penetration (JIS K 2220) of the grease is preferably in a range of 200-350. In a case in which the worked penetration is less than 200, a lack of lubrication might be caused because of less oil separation. In a case in which the worked penetration is more than 350, the grease is so soft that the grease is liable to undesirably leak out of the bearing.

As described above, the bending rigidity of the hub bearing that supports a wheel (tire) of a vehicle is a factor that affects the steering stability of the vehicle, and thus it is important to appropriately design the bending rigidity of the hub bearing. Generally, the bending rigidity of the hub bearing is measured in a state in which a shaft is not rotated. It is expected that the bending rigidity when the shaft is rotated is not largely different from the bending rigidity when the shaft is not rotated, however the bending rigidity when the shaft is rotated is not yet clearly known. The present inventors conducted a dynamic analysis relating to a relation between a rotation speed of the shaft and the bending rigidity of the hub bearing, using an integrated dynamic analysis system. According to the dynamic analysis, it is found that the hub bearing has not only a function of a static spring element but also a delay in a response (hysteresis) in a change of a camber angle relative to a moment. Further, it is also found that the magnitude of the hysteresis is based on the traction that acts in a longitudinal direction of a contact oval between the ball and the raceway. The present invention is based on such knowledge, and focusing on the traction coefficient to reduce the traction, the surface roughness of the raceway surface (the viscosity or the kind of the base oil as needed) is adjusted to be low.

The procedure of the dynamic analysis is described below.

Figure 4:
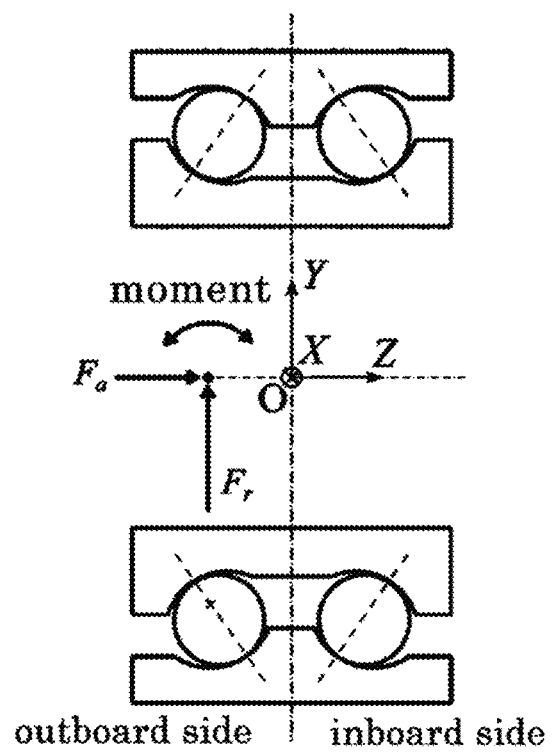
FIG. 4 is a view showing a point of load and a coordinate system in an analysis.

A time waveform of an inclined angle of the hub bearing in operation when moment is applied thereto is calculated using IBDAS (Integrated Bearing Dynamic Analysis System) for rolling bearings developed by the present applicant (NTN Corporation). The point of load and the coordinate system for the analysis shown in FIG. 4 are applied to the double-row angular ball bearing shown in FIG. 1. A degree of freedom of movement and a condition of constraint set in an analytic model are described in Table 1 below.

TABLE 1

| Outer ring | Degree of freedom: non (fixed) |
|---|---|
| Inner ring | Degree of freedom: translational three degrees and rotational two degrees<br>Constraint: rotation at constant speed |
| Ball | Degree of freedom: translational three degrees and rotational three degrees |
| Cage | Degree of freedom: translational three degrees and rotational three degrees<br>Elastic deformation: 56 modes |

The outer ring of the bearing is fixed in a space. The inner ring has the degrees of freedom of movement excluding rotation. Mass of the hub wheel and moment of inertia are applied to the inner ring. Each of the ball and the cage has the degrees of freedom of translational three degrees and rotational three degrees. The IBDAS is configured to consider the elastic deformation of the cage using the mode synthesis method. In this analysis, total 56 deformation modes are applied to each cage. In order to execute the dynamic analysis relating to the movement of a ball bearing system having the above-described degrees of freedom, it is necessary to appropriately introduce the force in a normal direction and the force in a tangential direction of the contact parts between the ball and the raceway ring and between the ball and the cage, into the calculation. Each of calculation methods is described below. Further, the moment of the ball caused by various forces is also appropriately introduced into the calculation.

Contact Part Between Ball and Raceway Ring

Figure 5:
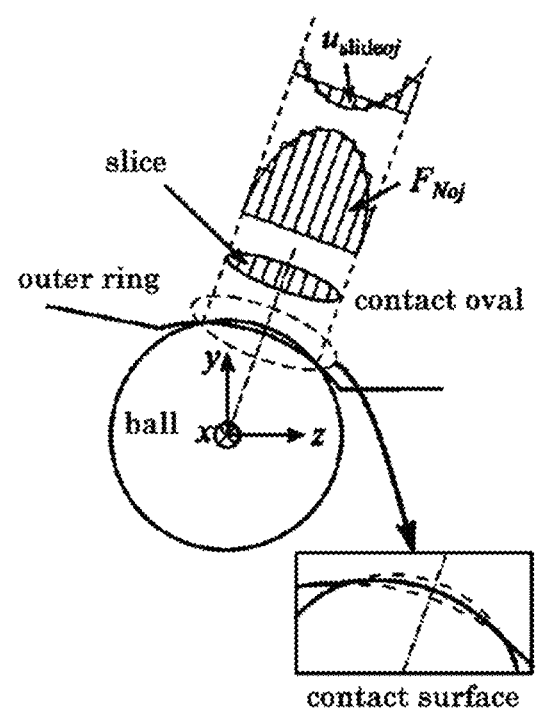
FIG. 5 is a view showing a calculation model including a ball and a contact part of an outer ring.
Figure 5:
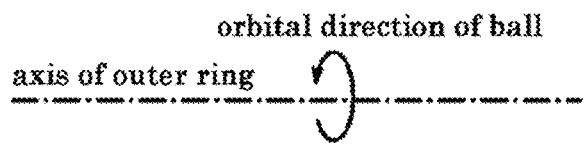

The force in the normal direction is obtained as it is assumed that the contact pressure follows the Hertz's theory. In the calculation of the force in the tangential direction, in order to appropriately represent the three-dimensional movement of the ball, a distribution of the contact pressure and a distribution of the sliding speed in the longitudinal direction within the contact oval are considered as shown in FIG. 5. The specific calculation method is described below.

The load in the normal direction of a sliced piece formed by dividing the contact oval under the Hertz's pressure into n parts in the longitudinal direction is calculated by integrating the contact pressures in a short direction and then integrating the contact pressures within a sliced piece range in the longitudinal direction. The load in the normal direction is represented by the following formula (2).

[Math. 1]

$$F_{Nj} = \frac{3F_N}{2n}\left[1 - \frac{12\{j - 0.5(n-1)\}^2 + 1}{3n^2}\right] \quad (2)$$

Here, $F_{Nj}$ denotes the normal force applied to the j-th slice. $F_N$ denotes the normal force of the whole of the contact part. j denotes a slice number (0 to n−1). With respect to the force in the tangential direction, three force elements of traction, rolling viscous resistance force, and oil film force in a rolling direction that are supposed in the contact part under oil lubrication are considered. The analysis is executed as it is assumed that the hub bearing is lubricated by grease and the three force elements are determined only by the base oil of the grease.

The traction is now described. The traction is the force in the tangential direction caused on two members that get into rolling and sliding contact with each other. The traction is caused in a direction opposite to a rolling direction, on the member at a high speed side. The traction is caused in the rolling direction, on the member at a low speed side. In the example shown in FIG. 5, the traction caused on each slice is calculated using the following formula (3) as the traction is assumed to be caused in a direction opposite to a sliding velocity vector $u_{slidej}$ of the surface of the ball relative to the raceway surface.

[Math. 2]

$$\vec{F}_{Tj} = -\phi_j F_{Nj}\frac{\vec{u}_{slidej}}{|\vec{u}_{slidej}|} \quad (3)$$

Here, $F_{Tj}$ denotes the traction caused on the ball. $\phi_j$ denotes a traction coefficient. A subscript j corresponds to the j-th slice. A superscript arrow denotes a vector. The traction coefficient is calculated based on a known relation between the traction coefficient and the film thickness rate (the formula (1) which will be described later).

The sliding velocity vector $u_{slidej}$ of the surface of the ball relative to the raceway surface in the formula (3) is calculated from the following formula (4).

[Math. 3]

$$\vec{u}_{slidej} = \vec{v}_b + \vec{\omega}_b \times \vec{r}_{bcj} - (\vec{v}_{race} + \vec{\omega}_{race} \times \vec{r}_{racecj}) \quad (4)$$

Here, $v_b$ denotes a translational velocity vector of the center of the ball. $\omega_b$ denotes an angular velocity vector of the ball. $r_{bcj}$ denotes a position vector from the center of the ball to a surface of the j-th slice. $v_{race}$ denotes a translational velocity vector of the center of the raceway. $\omega_{race}$ denotes an angular velocity vector of the raceway. $r_{racej}$ denotes a position vector from the center of the raceway to the surface of the j-th slice. The position of the surface of the slice within the contact oval is obtained using a known method. The sliding velocity vector $u_{slidej}$ of the slice of the surface of the ball has not only a component in the rolling direction but also a component in an axial direction. Thus, the traction also has a component caused in the longitudinal direction of the contact oval.

As the other force elements caused in the contact part between the ball and the raceway surface, the rolling viscous resistance force $F_R$ and the oil film force $F_P$ in the rolling direction are considered. The rolling viscous resistance force $F_R$ is caused by the viscosity of lubrication film and is applied to the ball and the raceway surface in a direction opposite to the rolling direction. Since the rolling viscous resistance force $F_R$ is caused by the lubrication film, it is assumed that the rolling viscous resistance force $F_R$ is caused only in the fluid lubrication where the lubrication film is formed. The magnitude of the rolling viscous resistance force is calculated based on one of two known formulas used in a case of piezoviscous elastic region (PE) and piezoviscous rigid region (PR) and in a case of isoviscous rigid region (IR), selected based on the region determination result. The oil film force $F_P$ in the rolling direction is caused by the pressure of the lubrication film and is applied to the ball and the inner ring raceway in a moving direction of each surface toward the contact point thereof and applied to the outer ring raceway in a direction opposite to a moving direction of the surface toward the contact point thereof. The magnitude of the oil film force in the rolling direction is obtained based on the rolling viscous resistance force and the shapes of the raceway ring and the ball.

Contact Part Between Ball and Cage

In a case in which nodes of the surface of the cage divided by a finite element method geometrically interferes with the ball, it is assumed that the normal force $F_{NC}$ according to the interference amount δ follows the Hertz's theory so that the following formula (5) is obtained.

[Math. 4]

$$F_{NC} = k_{HertzC}\delta_C^{1.5} \quad (5)$$

Here, $k_{HertzC}$ denotes a non-linear spring constant in the Hertz's theory.

Relating to the calculation of the force in the tangential direction, since pure-sliding is caused between the ball and the cage, the force caused by the sliding friction is only considered. The sliding friction force is calculated by the following formula (6).

[Math. 5]

$$\vec{F}_{TC} = -\mu_s F_{NC} \frac{\vec{u}_C}{|\vec{u}_C|} \quad (6)$$

Here, $\mu_s$ is a frictional coefficient. $\mu_C$ is a sliding velocity vector of the surface of the ball relative to a pocket of the cage.

Figure 6:
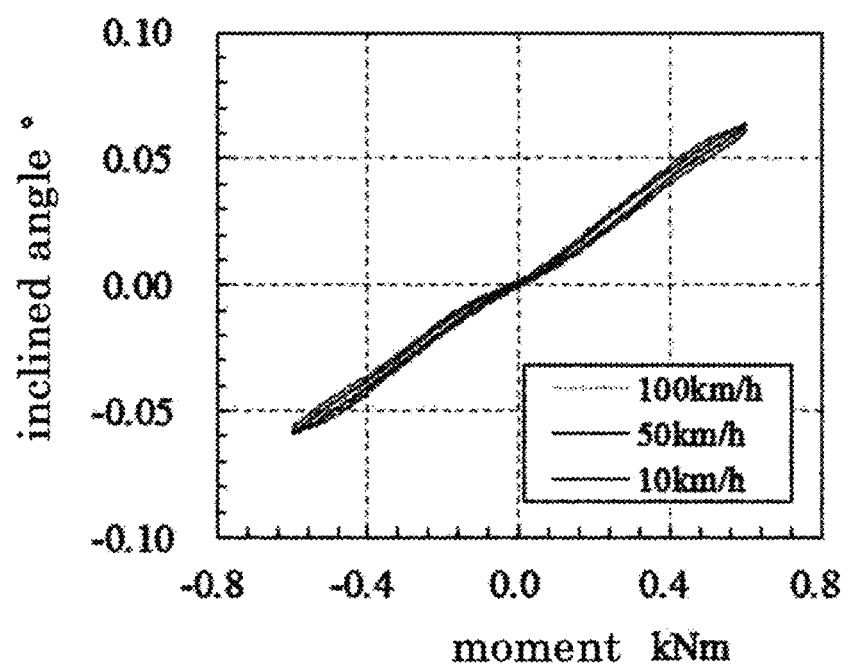
FIG. 6 is a graph of a calculation result of an inclined angle of an inner ring relative to a moment at each vehicle speed.

The calculation result of the inclined angle of the inner ring relative to the loaded moment at each vehicle speed is shown in FIG. 6 as an example of a result of analysis to which specified bearing specifications (dimensions and pressurization) and a specified operation condition (vehicle speed (three stages), moment, axial load, radial load, point of load, and variable frequency of load) are applied, executed based on the dynamic analysis procedure described above. The variable frequency of the load is set to 50 Hz.

As shown in FIG. 6, it is found that the waveform of the inclined angle of the inner ring relative to the moment has hysteresis. Further, it is found that the inclined angle has hysteresis, however the inclines (compliances) of the respective lines at respective vehicle speeds are substantially equal to each other. Accordingly, it is found that the rigidities of the hub bearings that are the reciprocals of the compliances are substantially equal to each other regardless of the vehicle speed.

Figure 7:
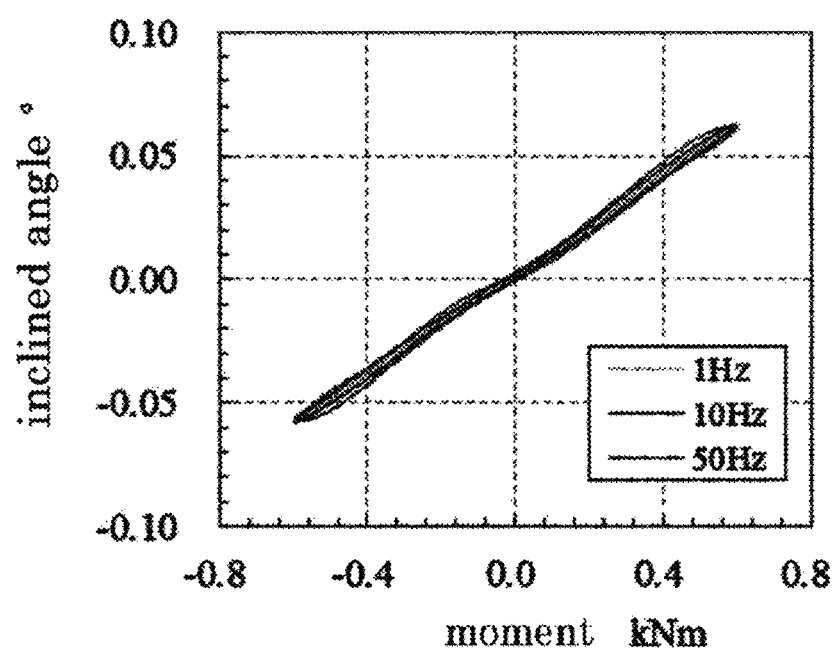
FIG. 7 is a graph of a calculation result of the inclined angle of the inner ring relative to the moment at each variable frequency of load.

Next, the calculation result of the inclined angle of the inner ring relative to the loaded moment when the variable frequency of the load is changed in three steps at a vehicle speed of 10 km/h (other conditions are the same as those shown in FIG. 6) are shown in FIG. 7. According to FIG. 7, it is also found that the inclines of the respective lines of the inclined angles of the inner ring relative to the moment are substantially equal to each other, and thus the rigidity of the hub bearing is not dependent on the variable frequency of the load.

Figure 8:
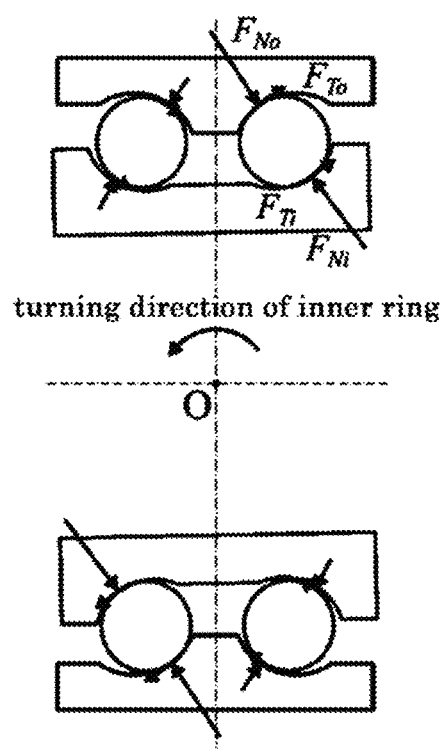
FIG. 8 is a schematic view showing an outline of normal force and traction applied to a ball from a raceway while the inner ring is turning in a counterclockwise direction.
Figure 9:
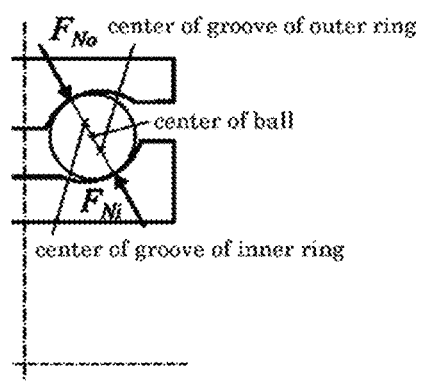
FIGS. 9 (a) to 9 (c) are schematic views showing the normal force and the traction applied to the ball from the raceway while the inner ring is turning in the counterclockwise direction.
Figure 9:
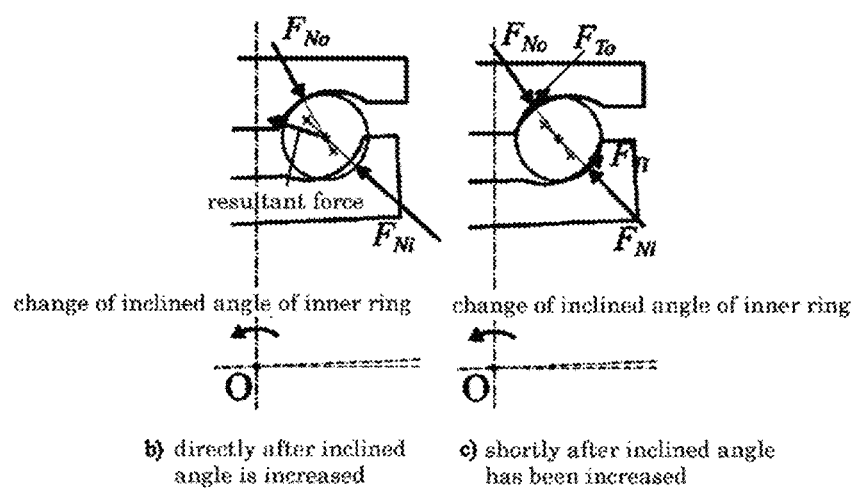

The mechanism that a fluctuation width $W_H$ is caused in the waveform of the inclined angle of the inner ring relative to the moment is now described. The fluctuation width $W_H$ corresponds to the magnitude of the hysteresis. As shown in FIG. 8, the reason why the fluctuation width $W_H$ is caused is that the traction in the longitudinal direction of the contact oval caused between the ball and the raceway surface interferes with the moving of the ball within a radial plane. The mechanism is described while focusing on the force applied to the ball at a right upper side in FIG. 8. A representative state of the force applied to the ball at the right upper side in FIG. 8 is shown in FIGS. 9 (a) to 9 (c). FIG. 9 (a) shows a state in which the inner ring keeps rotating while the inclined angle of the inner ring is constant. In this case, since the inner ring rotates while the inclined angle of the inner ring is unchanged, the center of the ball is located on a line passing the center of the groove of the inner ring and the center of the groove of the outer ring, and thus the normal force $F_{Ni}$ and the normal force $F_{No}$ applied to the ball from the inner ring and the outer ring, respectively, are aligned on the same line to balance with each other (the centrifugal force is ignored for the sake of convenience). The tractions applied to the ball from the inner ring and the outer ring are caused only in the rolling direction and thus the tractions have no component within the plane of FIG. 9 (a). FIG. 9 (b) shows a state in which the moving of the ball is still insufficient directly after the inclined angle of the inner ring is increased in a counterclockwise direction. In this case, the direction of the normal force $F_{Ni}$ from the inner ring is changed as shown in FIG. 9 (b) (for the sake of convenience, there is no traction $F_{Ti}$ applied to the ball from the inner ring). Accordingly, the resultant force of the forces applied to the ball from the raceways is directed toward a left upper direction in FIG. 9 (b). FIG. 9 (c) shows a state in which the ball is moved within the radial plane directly after the state shown in FIG. 9 (b), and the force applied to the ball and the moment balance with each other. The magnitude and the direction of each of the normal force $F_{Ni}$ and the normal force $F_{No}$ are changed in response to the moving of the ball, and the traction $F_{Ti}$ and the traction Fro applied to the ball from the inner ring and the outer ring are started to appear in the longitudinal direction of the contact oval and are caused in a right upper direction in FIG. 9 (c). The center of the ball cannot move to the line passing the center of the groove of the inner raceway and the center of the groove of the outer raceway due to the above-described tractions, and thus the state shown in FIG. 9 (a) does not happen.

Figure 10:
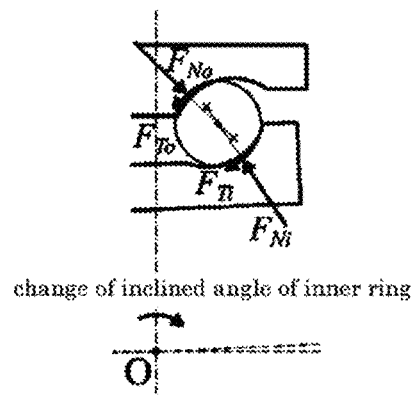
FIG. 10 is a schematic view showing the normal force and the traction applied to the ball from the raceway while the inner ring is turning in a clockwise direction.

Next, a case in which the inclined angle of the inner ring is the same as that shown in FIG. 9, however the inclined angle of the inner ring is changed in a clockwise direction while the loaded moment is decreasing is described. The normal forces and the tractions applied to the ball from the raceways while the inner ring is inclining in the clockwise direction are as shown in FIG. 10. The tractions applied to the ball from the inner ring and the outer ring are caused toward a left lower direction in FIG. 10, and thus the ball is located at the left lower side in FIG. 10 relative to a line passing the center of the groove of the inner raceway and the center of the groove of the outer raceway and the angle of the normal force $F_{Ni}$ is decreased. As a result, the magnitude of the moment applied to the inner ring by the ball is decreased relative to that shown in FIG. 9 (c). The traction is applied in the longitudinal direction of the contact oval, so that the position of the center of the ball while the inclined angle of the inner ring is changing cannot reach the position of the ball when the inclined angle of the ball is constant. Accordingly, it is found that the traction causes the fluctuation width $W_H$ of the inclined angle of the inner ring.

As described above, when the change of the inclined angle between the inner ring and the outer ring is calculated using the dynamic analysis by applying the moment, which cyclically changes relative to the time, to the hub bearing, it is found that the inclined angle has hysteresis. This hysteresis represents a delay in the response of the inclined angle relative to the moment. Further, according to the above-described analysis, it is found that the magnitude $W_H$ Of the hysteresis is defined by the traction applied in the longitudinal direction of the contact oval between the ball and the raceway.

In order to reduce the magnitude $W_H$ of the hysteresis of the hub bearing, it is preferable to reduce the traction coefficient (see the formula (3)). A general hub bearing employs grease. In a case in which the surface roughness of the raceway surface and the surface roughness of the ball are sufficiently small relative to the oil film formed by the base oil of the grease, the traction coefficient is determined by a traction property of the base oil. In a case in which the surface roughness is not sufficiently small, a direct contact is caused between the protrusions of the surfaces (interference between the protrusions), and thus the traction coefficient is determined by both of the traction caused by the oil film and the traction caused by the interference between the protrusions. Based on this fact, it is effective for reducing the traction coefficient that the traction property of the base oil of the grease is improved, specifically the base oil having low viscosity (mineral oil) or synthetic oil (PAO oil or the like) that is high in cost but shows a low traction property is employed. When the base oil having low viscosity or the synthetic oil having a low traction property is employed, the thickness of the oil film is decreased and thus the interference between the protrusions is easily caused. Accordingly, it is important to reduce the surface roughness.

Here, a way of thinking relating to the interference between the protrusions in the conventional hub bearing is described. Excessive interference between the protrusions causes peeling or surface-starting flaking. Thus, a relation between the thickness of the oil film and the surface roughness has been designed so as not to cause the excessive interference between the protrusions. Specifically, the base oil having viscosity not to cause the excessive interference between the protrusions relative to the surface roughness formed by using a machining technique for the conventional rolling bearing has been added in the grease. When the base oil having low viscosity is employed, the torque of the hub bearing is reduced to some extent, and the degree of the reduction is less than that caused by the friction of the seal and the stirring resistance of the grease (this is largely affected by the consistency or the apparent viscosity of the grease, and thus largely affected by a composition of a thickener). Accordingly, the base oil has not been considered in a viewpoint for reducing the traction coefficient.

In the present invention that reduces the traction coefficient, the surface roughness of the raceway surface is reduced to suppress the interference between the protrusions, so that the traction property of the base oil of the grease is improved. A relation between the surface roughness of the raceway surface, the dynamic viscosity of the base oil and the traction coefficient is described in detail below.

Figure 2:
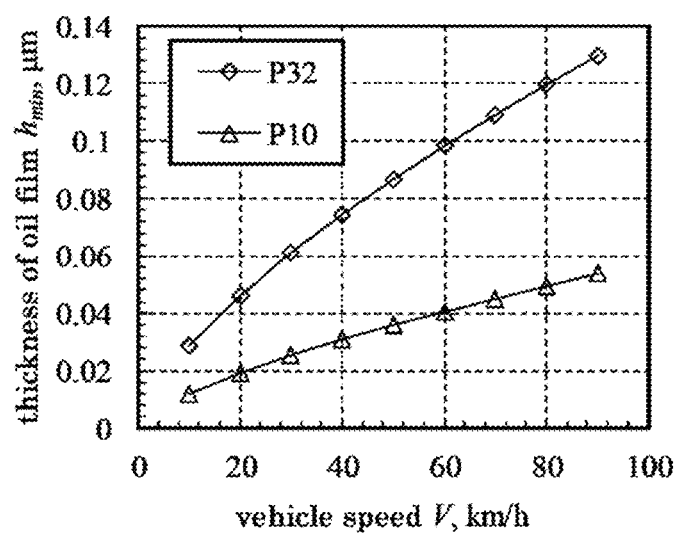
FIG. 2 is a graph of a calculation result of a thickness of oil film of the hub bearing.

FIG. 2 is a calculation example of the thickness of the oil film between the ball and the raceway ring in the hub bearing relative to the vehicle speed. The thickness of the oil film at an inner ring side is smaller than the thickness of the oil film at an outer ring side by approximately 15%, and thus the calculation is executed using the minimum oil film thickness $h_{min}$ at the inner ring side. The temperature is 40° C. The dynamic viscosities of the base oils are ISO VG 32 and ISO VG 10 (hereinafter, the base oils are simply described as P32 and P10, respectively). Each number corresponds to the dynamic viscosity (mm²/s) at 40° C. The viscosity of P32 is close to the lower limit in the base oil used in the grease for hub bearings. P10 is generally used as a lubrication oil for bearings. However, the viscosity of P10 is lower than that of P32, and thus P10 is not general in the hub bearing.

By setting the traction coefficient in the rolling contact part in the hub bearing to be small, the delay in the response of the incline between the inner ring and the outer ring of the hub bearing when the moment to be applied to the hub bearing varies can be made small. As a result, the responsiveness of the vehicle relative to the steering can be improved. The traction coefficient is a function of a film thickness ratio of the lubrication oil film caused by the grease. This relational formula is derived from a known relation between the traction coefficient and the film thickness ratio. The film thickness ratio is represented by ratio of $h_{min}/\sigma$ between the minimum film thickness $h_{min}$ of the lubrication oil film formed on contact surfaces of two objects and a composite root mean square roughness $\sigma$ of the contact surface.

An example of the known relation includes a test result in Non-Patent Document 2 (Muraki & Kimura, Traction Property of Lubrication Oil, 1st report, 1983, FIG. 7). Plotted data in the graph in the figure denotes the type of the oil to be measured. P denotes a paraffinic mineral oil, N denotes naphthenic mineral oil, and numerals denote the dynamic viscosities (mm²/s) at 40° C. According to the relation shown in the figure, it is found that the traction coefficient is largely increased in all lubrication oil when the film thickness ratio becomes smaller than approximately 1. In order to examine the surface roughness that is capable of suppressing the increase of the traction coefficient in the actual use range, the traction coefficient $\phi$ is approximated by the film thickness ratio $\Lambda$ obtained from the following formula (1).

[Math. 6]

$$\phi = \begin{cases} (\phi_b - \phi_h)\left(\frac{\Lambda - \Lambda_h}{\Lambda_b - \Lambda_h}\right)^6 + \phi_h & \text{for } \Lambda < \Lambda_h \\ \phi_h & \text{for } \Lambda \geq \Lambda_h \end{cases} \quad (1)$$

Here, $\phi_b$ denotes a traction coefficient in boundary lubrication. $\phi_h$ denotes a traction coefficient in hydrodynamic lubrication. $\Lambda_b$ denotes a film thickness ratio of a boundary between the boundary lubrication and the hydrodynamic lubrication. $\Lambda_h$ denotes a film thickness ratio of a boundary between mixed lubrication and the hydrodynamic lubrication. Based on the figure in Non-Patent Document 2, respective values are set such that $\phi_b$=0.12, $\phi_h$=0.03, $\Lambda_b$=0.05, and $\Lambda_h$=1.5. In the boundary lubrication, the interference part between the protrusions substantially supports the load. In the hydrodynamic lubrication, pressure of fluid film supports the load. The mixed lubrication is intermediate between the boundary lubrication and the hydrodynamic lubrication. In the mixed lubrication, the interference between the protrusions and the fluid film share and support the load. Generally, in a case in which $\Lambda$ is 3 or more, it is considered that the fluid film completely supports the load. According to the figure in Non-Patent Document 2, it is found that, in a case in which $\Lambda$ is approximately 1.5, the traction property is largely dependent on the property of the oil film and the load supported by the interference part between the protrusions is largely decreased. Further, it is considered that, in a case in which $\Lambda$ is 1.5 or more, wear caused by the interference between the protrusions is extremely less, which can be ignored.

Figure 3:
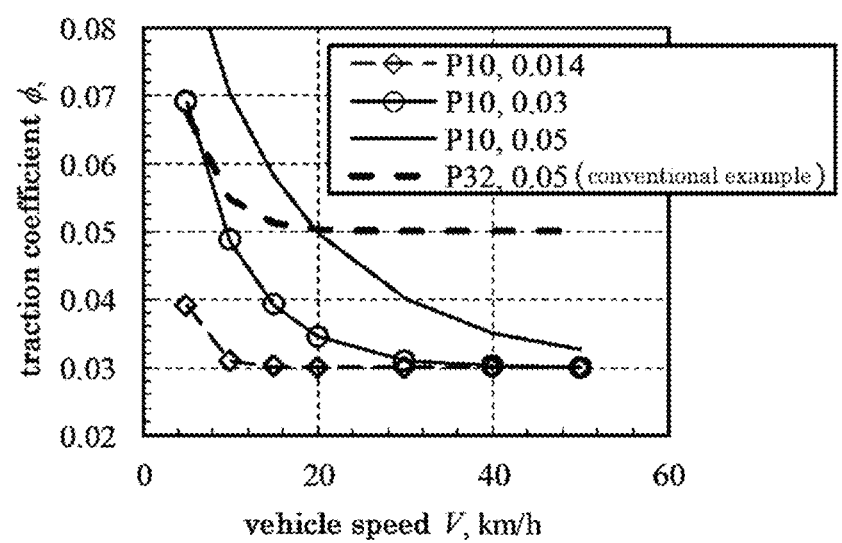
FIG. 3 is a graph of a calculation result of a traction coefficient.

The results of the traction coefficients relative to the speed of the vehicle examined using the formula (1) are shown in FIG. 3 (temperature of 40° C.). A calculation example using the conventional surface roughness (the surface roughness of the raceway surface is 0.05 μmRa) and P32 is also shown as a reference. In the calculation, the above-described surface roughness is applied to each of the raceway surfaces of the raceway rings at both of the stationary side and the rotatable side. The traction coefficient of P32 is set as $\phi_h$=0.05, based on the figure in Non-Patent Document 2. In the conventional example, the film thickness ratio is large because the viscosity of the base oil is relatively high, which becomes the traction coefficient of $\phi_h$ when the speed is 20 km/h or more. It is found that the traction coefficient is increased due to the interference between the protrusions when the speed is less than 20 km/h.

As shown in FIG. 3, in an example using the surface roughness as same as the conventional surface roughness and P10 (P10, 0.05), the traction coefficient is smaller than the conventional example in a speed range of 20 km/h or more. The reason thereof is that $\phi_h$ is 0.03, which is small due to low viscosity. When the speed is lower than 20 km/h, the traction coefficient of the example (P10, 0.05) is larger than the conventional example. (P10, 0.03) and (P10, 0.014) are results of examples using the oil P10 and the surface roughness of 0.03 μmRa and 0.014 μmRa, respectively. When the surface roughness is decreased to 0.03 μmRa, a low traction property of the base oil in a speed range of 30 km/h or more can be sufficiently derived. It is considered that a high responsiveness of a vehicle is required at approximately 30 km/h and accordingly a case that can secure the surface roughness of 0.03 μmRa or less is acceptable in an actual use. Further, when the surface roughness is set to be small, the traction coefficient in a lower speed range can be made low. However, according to the result of the surface roughness of 0.014 μmRa shown in FIG. 3, the traction property of the base oil can be derived also in the speed of 10 km/h, so that the surface roughness less than 0.014 μmRa is unsuitable from a viewpoint of its machining cost.

As described above, in order to reduce the traction coefficient in the hub bearing using the grease having the low viscosity base oil, the surface roughness of the raceway surface is set to 0.03 μmRa or less. It is sufficient that the lower limit of the surface roughness is 0.014 μmRa. The surface roughness of the ball generally used in the hub bearing is 0.001 μmRa which is extremely small compared to the surface roughness of the raceway surface. Thus, the above-describe surface roughness can be applied as it is to the surface roughness of the raceway surface. As shown in FIG. 3, the specific range of the traction coefficient is 0.04 or less at 40° C. when the vehicle speed is 20 km/h or more.

In the above-described dynamic analysis of the hub bearing, relating to the tractions of the inner ring and the outer ring, the traction at the stationary ring side is larger than the traction at the rotatable ring side. The reason of this is as below. The rotatable ring to which the tire is mounted swings relative to the stationary ring mounted to the vehicle body, due to a turning load. At this time, the ball moves in a direction in which the raceway surface at the swinging side moves, and thus it is considered that the sliding speed in the axial direction becomes large compared to the contact part of the stationary ring. Accordingly, it is preferable that the surface roughness of the above-described raceway surface is applied to at least the raceway surface of the stationary ring in which larger sliding is caused and the traction is liable to increase. The surface roughness of the raceway surface may be applied to only the raceway surface of the stationary ring.

In the example shown in the figures, the outer ring serves as a stationary side raceway ring, and the hub wheel and the inner ring serve as a rotatable side raceway ring, however the present invention may be similarly applied to a configuration in which the stationary side and the rotatable side are reversed. Also in this case, in the raceway surface of the stationary ring, large sliding is caused and the traction is liable to increase, and thus it is preferable that the specified surface roughness is applied to at least the raceway surface of the stationary ring.

The hub bearing of the present invention can reduce the delay in the response of the hub bearing and improve the steering stability of the vehicle, and thus the hub bearing of the present invention can be widely used as a hub bearing that rotatably supports wheels of various vehicles. Further, the hub bearing of the present invention can be also preferably used as a hub bearing used when the automatic driving technology of the vehicle will have been developed so that a computer controls the steering of the vehicle.

The invention claimed is:

1. A hub bearing for vehicles, the hub bearing comprising:
a stationary side raceway ring;
a rotatable side raceway ring;
a plurality of rolling elements having rolling surfaces, said rolling elements being disposed between a raceway surface of the stationary side raceway ring and a raceway surface of the rotatable side raceway ring; and
a grease that lubricates a rolling contact part between each of the stationary side raceway ring and a raceway surface of the rotatable side raceway ring and the rolling elements, said grease being disposed in an inner space in which said rolling elements are dispersed in order to lubricate said contact part between each of the stationary side raceway ring and the raceway surface of the rotatable inner ring with the rolling elements;
wherein the surface roughness of at least one raceway surface selected from the raceway surface of the stationary side raceway ring and the raceway surface of the rotatable side raceway ring in the rolling contact part is 0.030 μmRa or less,
wherein the grease is configured such that a traction coefficient in the rolling contact part is 0.04 or less at 40° C. when a vehicle speed is 20 km/h or more, and
wherein a dynamic viscosity at 40° C. of a base oil of the grease is 5-20 mm²/s.

2. The hub bearing as defined in claim 1, wherein the surface roughness of the raceway surface of the stationary side raceway ring is 0.030 μmRa or less.

3. The hub bearing as defined in claim 1, wherein the surface roughness of the selected raceway surface is 0.010-0.030 μmRa.

* * * * *